June 10, 1952 G. H. KANDOLL 2,599,838
AUTO LOADING SELF-PROPELLED DUMPING VEHICLE
Filed March 7, 1949 4 Sheets-Sheet 1

GUSTAF H. KANDOLL
INVENTOR.

June 10, 1952  G. H. KANDOLL  2,599,838
AUTO LOADING SELF-PROPELLED DUMPING VEHICLE
Filed March 7, 1949  4 Sheets-Sheet 3

GUSTAF H. KANDOLL
INVENTOR.

BY
James A. Tiernan
ATT'Y

June 10, 1952 G. H. KANDOLL 2,599,838
AUTO LOADING SELF-PROPELLED DUMPING VEHICLE
Filed March 7, 1949 4 Sheets—Sheet 4

GUSTAF H. KANDOLL
INVENTOR.

Patented June 10, 1952

2,599,838

UNITED STATES PATENT OFFICE 2,599,838

AUTO-LOADING SELF-PROPELLED DUMPING VEHICLE

Gustaf H. Kandoll, Grays River, Wash.

Application March 7, 1949, Serial No. 79,947

1 Claim. (Cl. 214—83.16)

This invention relates to improvements in a self-loading and dumping self-propelled vehicle particularly well-adapted for use in dairy barns and the like.

It is one of the principal objects of the invention to provide a vehicle of this character which is highly maneuverable and embodying an endless conveyor readily adjustable in a vertical plane to various depths of drainage troughs arranged rearwardly of stalls for cleaning the same.

A further object is the provision of a receptacle carried by the vehicle for receiving material lifted by the conveyor and the provision of means for automatically dumping the contents of the receptacle.

A still further object is the provision of a rotary brush or sweeper rotatably and swingably mounted to the chassis of the vehicle for selective contact with the surface being cleaned.

These and other objects will appear as my invention is more fully hereinafter described in the following specification, illustrated in the accompanying drawings, and finally pointed out in the appended claim.

Figure 1:
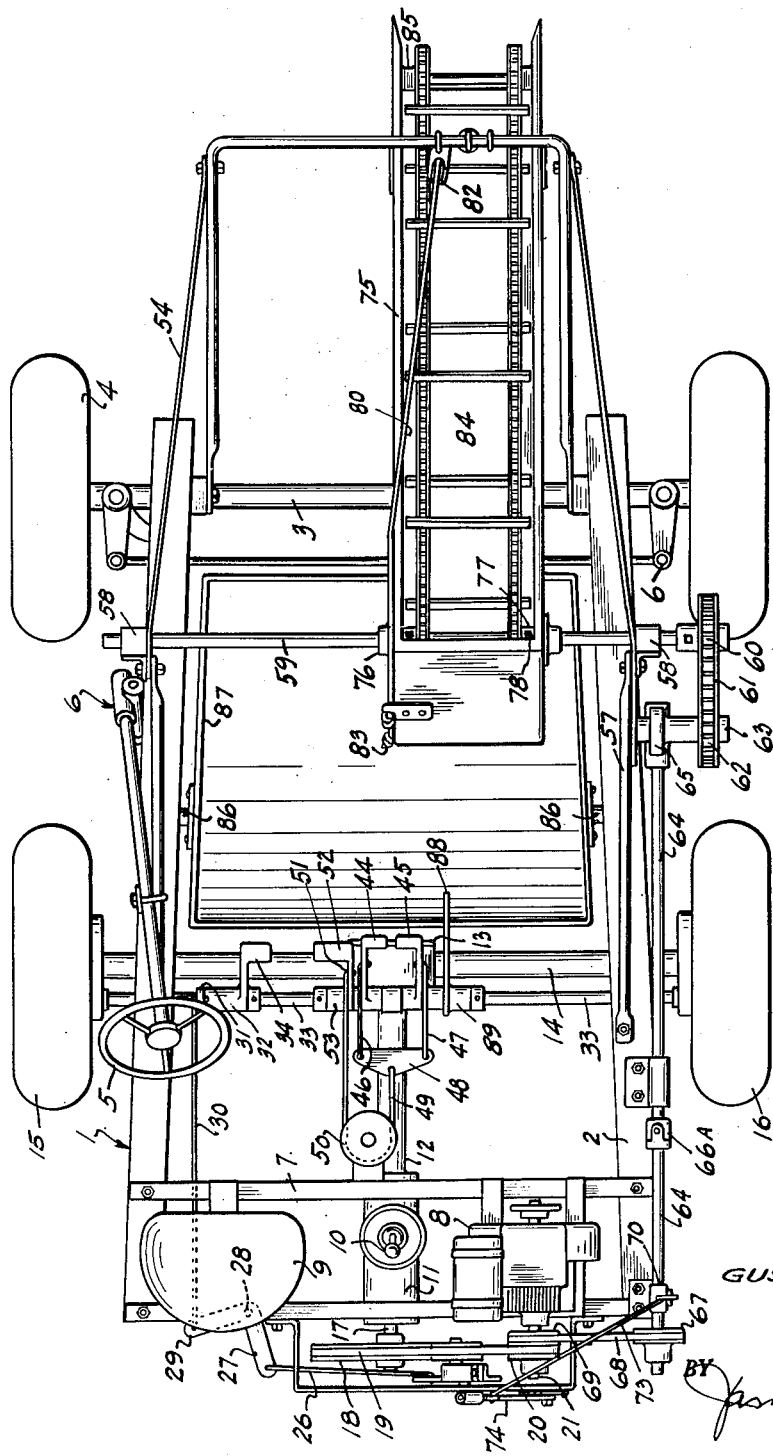
Figure 1 is a top plan view of a machine made in accordance with my invention.
Figure 2:
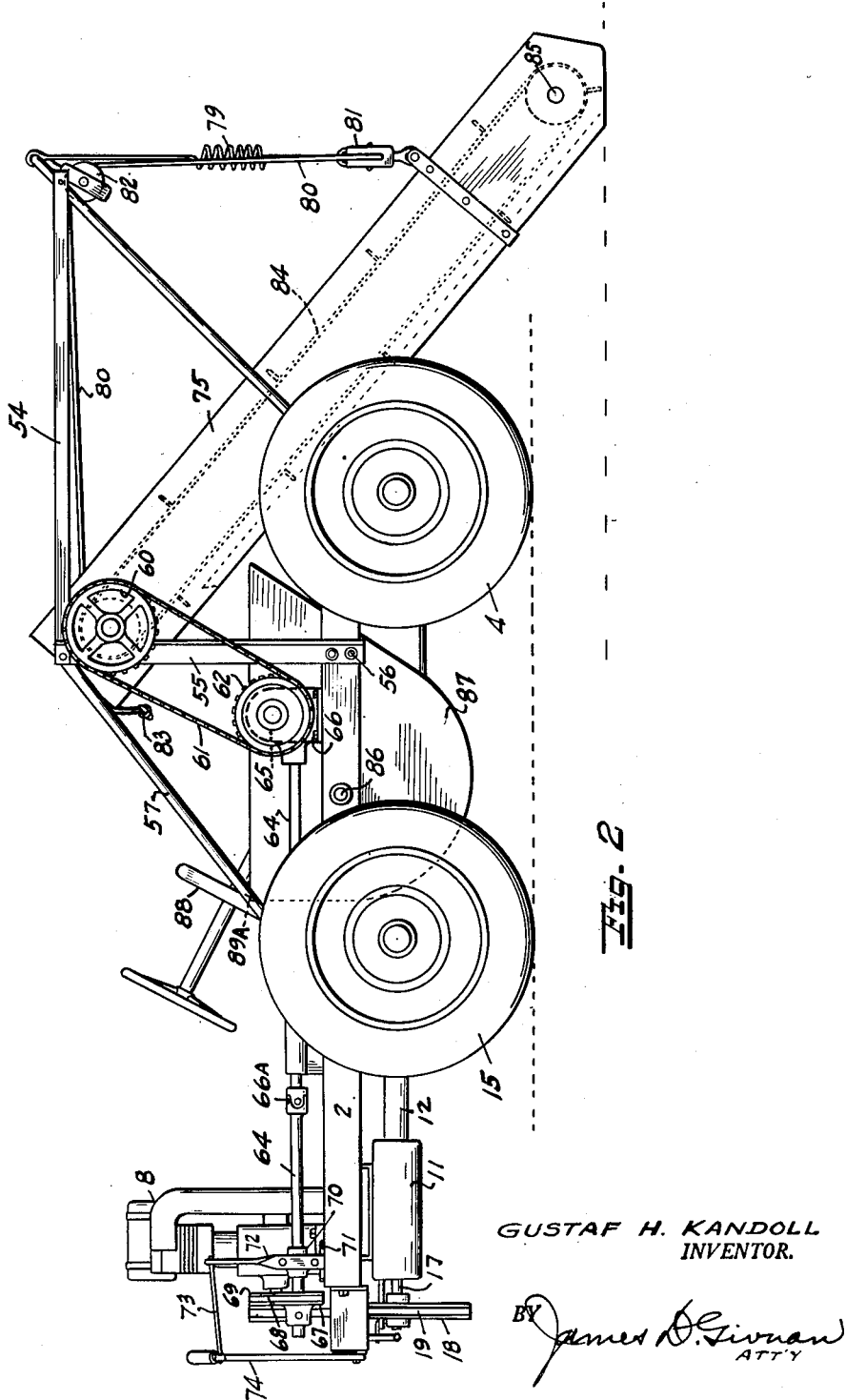
Figure 2 is a side elevation of Figure 1.
Figure 3:
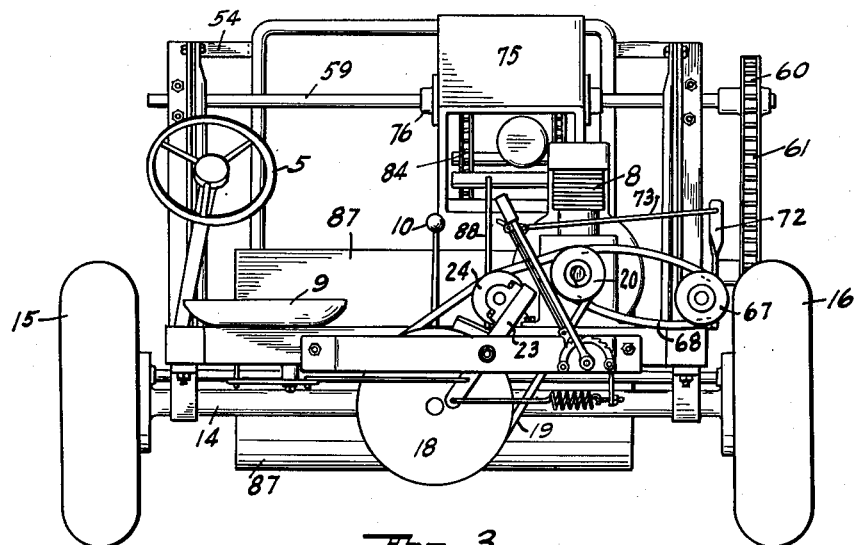
Figure 3 is a rear elevation of Figure 2.
Figure 4:
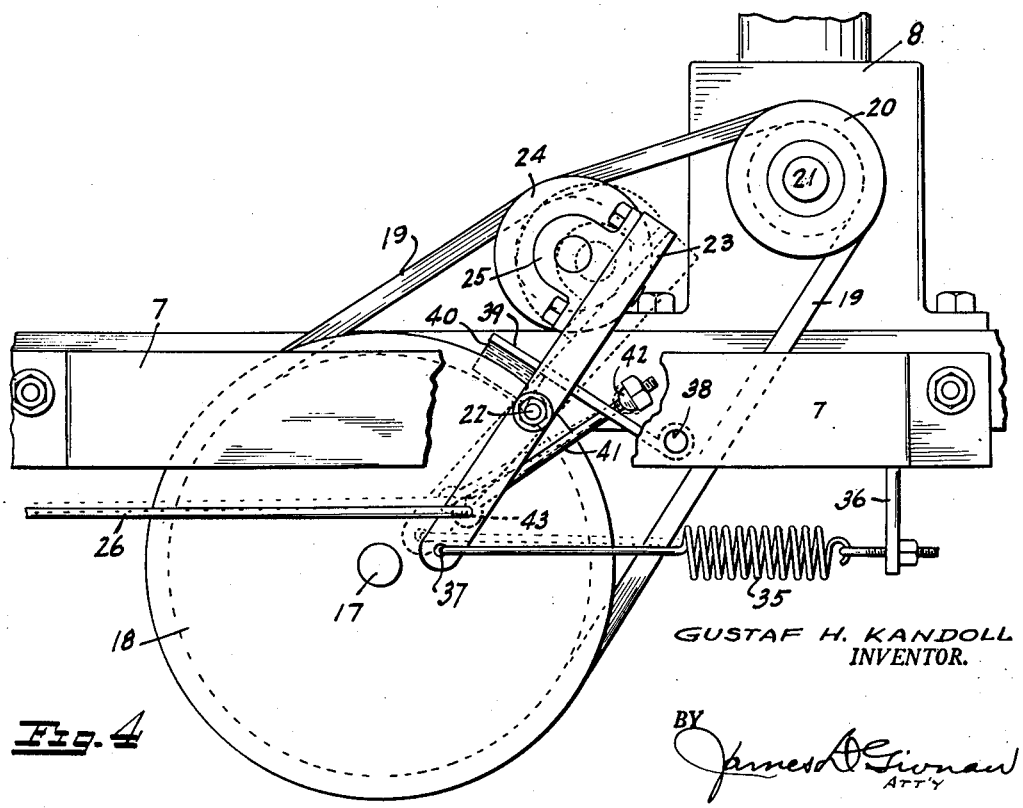
Figure 4 is an enlarged fragmentary detailed view of power transmission means.

Referring now more particularly to the drawings:

The chassis of the vehicle is of more or less conventional design comprising spaced apart longitudinal frame members 1 and 2 mounted at their forward ends upon springs to which is secured a front axle 3 provided with the usual steering wheels 4 controlled by a steering wheel 5 and the conventional steering mechanism generally indicated at 6. Secured across the rear ends of the frame members is a transverse frame 7 upon which I mount any approved type of engine 8 and a driver's seat 9 within convenient reach of which is a shifting lever 10 for power transmission means indicated at 11. Extending forwardly from the transmission 11 is a drive shaft 12 connected through a differential 13 with a rear axle 14 to the outer ends of which are secured driving wheels 15 and 16 in the conventional manner. Extending rearwardly from the transmission 11 is a driven shaft 17 provided with a driven pulley 18 embraced by a belt 19 which embraces and is driven by a driving pulley 20 secured to the shaft 21 of the engine 8. Pivotally mounted as at 22 to the cross frame 7 (see Figures 3 and 4) is a rocker arm 23 whose one end carries an idling pulley 24 by means of a bearing 25. The opposite end of the rocker arm is connected to one end of a control rod 26 whose opposite end connects with one leg 27 of a bellcrank (see Figure 1) pivoted as at 28 to the frame 7 and whose other leg 29 is connected with one end of a rod 30 whose opposite end connects with an arm 31 projecting upwardly from a sleeve 32 rotatably mounted upon a tubular shaft 33 extending across and secured to the longitudinal frame members 1 and 2. The sleeve 32 is provided with a foot pedal 34 which is normally held in a rearward position by a tension spring 35 (see Figure 4) whose one end is adjustably anchored to a bracket 36 secured to and depending from the frame 7 and whose opposite end is connected as at 37 with the lower end of the rocker arm 23 below the pivot point 22. Swingably mounted as at 38 to the frame 7 is a brake shoe 40 shaped in cross section to correspond with the shape of the groove in the driven pulley 18 for frictional engagement therewith when the rocker arm 23 and idling pulley 24 are pulled out of contact with the belt 19 as shown in dotted lines in Figure 4, at which time, of course, the driven pulley 18 will be held against rotation. Downward pressure is applied to the brake shoe 40 by means of a link 41 adjustably attached as at 42 to the brake arm 39, and pivotally attached as at 43 to the lower end of the rocker arm 23 so that, as the lower end of the rocker arm is pulley into the dotted line position through the medium of the control rod 26 and foot pedal 34, the brake shoe will be applied to the pulley 18 at the same time the idling pulley is swung away from the belt into an idling position.

To render the vehicle more maneuverable than that obtained by the steerable front wheels only, I render the rear wheels subject to selective individual braking pressure whereby one wheel may be locked to serve as a pivot point for movement of the vehicle in a turn in one direction or the other.

To accomplish this, I provide two brake rods rotatably mounted within the tubular shaft 33 and connected at their outer ends with the driving wheel (see Figures 15 and 16) and at their inner ends with individual brake pedals 44 and 45 which may be operated independently to apply the brakes to the left and right wheels respectively and selectively by pulling the pedals rearwardly toward the operator of the vehicle. Each of these brake pedals is connected by cables 46 and 47 with a spreader plate 48 to which is attached one end of a cable 49 which passes around a pulley 50 and whose opposite end connects as at 51 with what might be termed a master brake pedal 52. This brake pedal is capable upon forward movement of applying both brakes to the rear wheels simultaneously by means of the cable 49 and the plate 48, which, when pulled rearwardly, also draws the pedals 44 and 45 rearwardly by means of the respective cables 46 and 47. The brake pedal 52 is rotatably mounted upon the shaft 33 by means of a sleeve 53.

The vehicle may, of course, be driven forwardly at various selected speeds and in reverse by means of the transmission 11.

At the forward end of the chassis I mount an elevated horizontal frame 54 by means of vertical supports 55 secured as at 56 to the frame members and further supported by diagonal braces 57 secured to the frame and to the chassis. Rotatably mounted across the rear end of the frame 54 by means of bearings 58 is a shaft 59 provided at one of its ends with a sprocket wheel 60 embraced by a sprocket chain 61 embracing and driven by a sprocket wheel 62 secured to a shaft 63 driven by a shaft 64 through any approved type of worm and worm gear disposed within a housing 65 secured as at 66 to the frame member 2. The opposite end of the shaft is connected through a universal joint 66A with a driven pulley 67 embraced by a driving belt 68 which embraces and is driven by a pulley 69 secured to the shaft 21 of the engine 8. The outer end of the shaft 64 is rotatably supported in a bearing 70 hingedly mounted as at 71 to the frame member 2 for outward and inward movement with respect thereto by tightening and loosening the driving belt 68 for imparting rotation to the shaft 64 or for rendering it inoperative. The bearing 70 is carried by a lever 72 whose upper end is connected by a link 73 with a control lever 74 within convenient reach of the operator.

Adjustably mounted upon the shaft 59 for movement into various positions transversely of the frame 54 is a conveyor frame 75 mounted upon the shaft 59 by bearings 76 carried by the side members of the frame 75 and backed by the hubs of sprocket wheels 77 lockable to the shaft by set screws 78 for locking the frame in any adjusted position upon the shaft 59. By means of the bearings 76 the conveyor frame may be tilted downwardly or upwardly with respect to the surface of the ground being dealt with. Interconnecting the forward end of the conveyor frame with the forward end of the frame 54 is a coil spring 79 of sufficient tension to exert enough upward pull on the conveyor frame to enable its front end to slide freely over a surface being dealt with. For convenience in raising or lowering the conveyor frame about its pivot points established by the bearings 76, I pass a cable or rope 80 around a pulley block 81, over a pulley 82 and terminate the cable as at 83 within convenient reach of the operator.

Disposed within the frame 75 is an endless conveyor 84 rotatably mounted upon bearings 85 at the forward end of the frame and by means of the sprocket hubs 77 at the opposite end of the frame. The sprockets being locked to the shaft 59 by the set screws 78 are driven thereby through the medium of the shaft 64, sprockets 60 and 62, and sprocket chain 61 as aforesaid.

Disposed beneath the rearward end of the conveyor frame and swingably mounted to the chassis by means of stub shafts 86 is a receptacle 87 normally held in a receiving position by means of a lever 88 pivotally attached as at 89 to the tubular shaft 33 and notched as at 89A for engagement with the top edge of the rear wall of the receptacle. It will be noted that the receptacle 87 is overbalanced forwardly of the stub shafts or pivot points 86 and rearward movement of the lever 88 out of engagement with the rear wall of the receptacle will cause the receptacle to automatically tilt forwardly and downwardly by gravity into a spilling position.

Figures 5, 6:
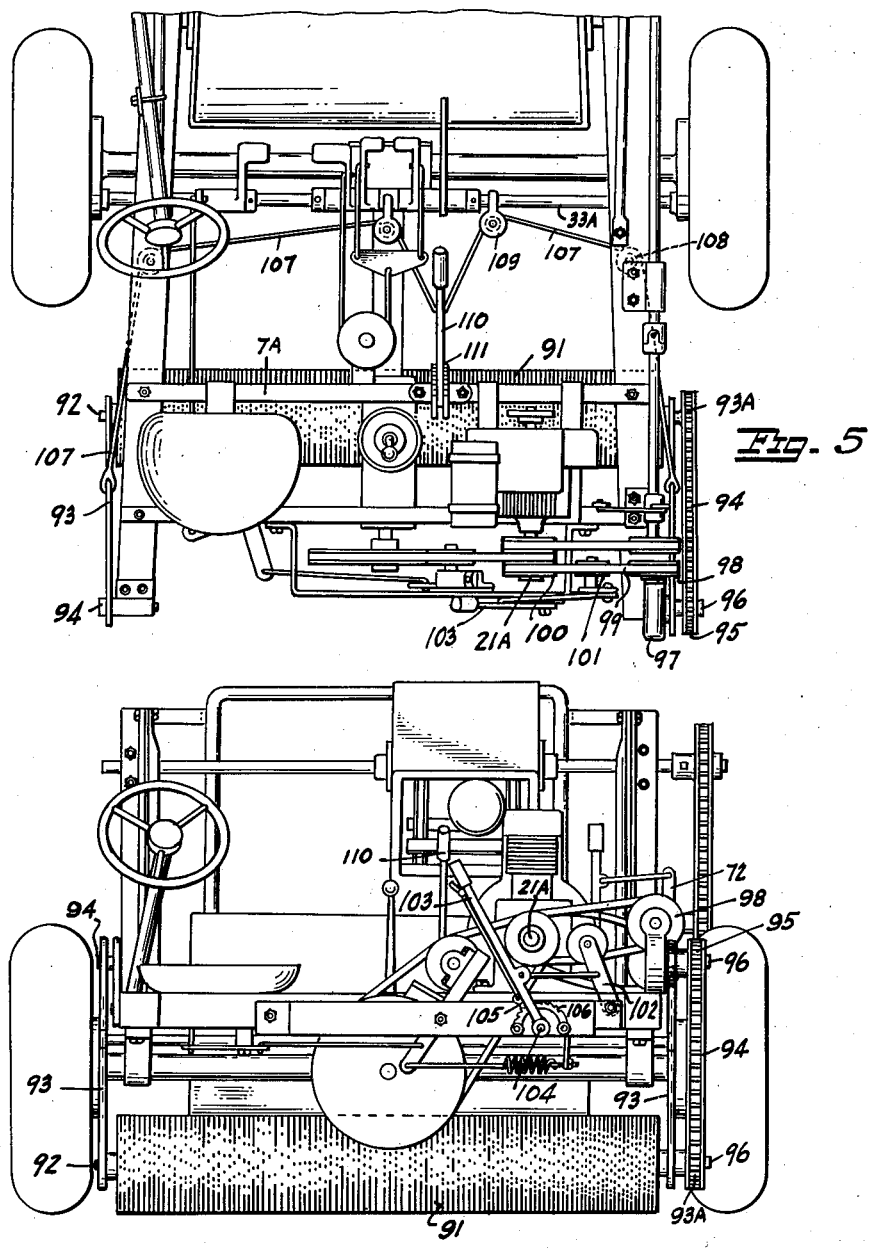
Figure 5 is a fragmentary top plan view of a rotary brush applied to the rear end of the vehicle.
Figure 6 is an end elevation of Figure 5.

In the modification of the invention as illustrated in Figures 5 and 6, I attach a rotary brush 91 by means of its shaft 92 journaled in the lower ends of a pair of arms 93 whose upper ends are swingably attached to the chassis 1 by means of stub shafts 94.

One end of the brush shaft 92 is provided with a sprocket wheel 93 embraced by a sprocket chain 94 which also embraces and is driven by a driving sprocket 95 secured to a shaft 96 driven by a worm and worm gear transmission 97. The worm is driven by a pulley 98 embraced by a belt 99 which embraces an extra pulley 100 secured to the engine shaft 21A.

An idling pulley 101, rotatably mounted to the upper end of a swingable arm 102, is provided for selectively imparting rotation to the brush by its engagement with the belt 99. For convenience in holding the arm 102 and idling pulley in operative or inoperative positions, I provide a lever 103 pivoted to the chassis as at 104, linked to the lever 102 and provided with a pawl 105 for engagement with a ratchet 106 also secured to the chassis.

For convenience in raising and lowering the brush, I secure a cable 107 to both arms 93 and pass the cable around pullies 108 carried by the chassis and also around pulleys 109 carried by the tubular cross shaft 33A. Between the pulleys 109, the cable is secured to a lever 110 pivotally attached to the transverse frame 7A and also provided with a pawl and ratchet assembly generally indicated at 111.

Although I have shown the rotary brush disposed at right angles to the chassis, it is to be understood that the brush could be arranged in an angular position with respect thereto if desired.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

A vehicle of the character described comprising in combination a chassis mounted upon traction wheels and steerable wheels, an engine mounted at the rear end of the chassis and operatively engageable with said traction wheels through power transmission means, a frame superimposed upon the chassis and extending forwardly therefrom, a conveyor frame mounted for pivotal and slidable movement at the inner end of said frame, the opposite end of the conveyor frame being disposed downwardly and forwardly with respect to said frame and yieldingly interconnected therewith, means attached to the conveyor frame for raising and lowering the same with respect to said chassis, an endless conveyor rotatably mounted within the conveyor frame and operatively connected with said engine for imparting selective rotation to said conveyor, a receptacle swingably mounted to said chassis and disposed beneath the pivoted end of said conveyor frame and being overbalanced forward of its mounting to said chassis whereby a load carried by the receptacle will swing the receptacle into an unloading position, and means carried by the chassis for normally holding the receptacle in a loading position.

GUSTAF H. KANDOLL.

REFERENCES CITED

The following references are of record in the file of this patent:

UNITED STATES PATENTS

| Number | Name | Date |
| --- | --- | --- |
| 580,358 | Allen, Jr. | Apr. 13, 1897 |
| 649,609 | Layman et al. | May 15, 1900 |
| 889,958 | O'Shaughnessy | June 9, 1908 |
| 981,652 | D'Homergue | Jan. 17, 1911 |
| 1,584,358 | Dement | May 11, 1926 |
| 1,782,176 | Piche | Nov. 18, 1930 |
| 2,199,257 | Ferrin | Apr. 30, 1940 |
| 2,381,892 | Fees | Aug. 14, 1945 |
| 2,519,136 | Jochim | Aug. 15, 1950 |
| 2,548,676 | Milz et al. | Apr. 10, 1951 |